United States Patent
Alijan (10) Patent No.: US 11,916,586 B2
(45) Date of Patent: Feb. 27, 2024

(54) RF CHAIN OFFSET ESTIMATION AND REDUCTION

(71) Applicant: NOKIA SOLUTIONS AND NETWORKS OY, Espoo (FI)

(72) Inventor: Mehdi Alijan, Carrollton, TX (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 18/122,418

(22) Filed: Mar. 16, 2023

(65) Prior Publication Data
US 2023/0353183 A1  Nov. 2, 2023

(30) Foreign Application Priority Data

Apr. 28, 2022  (FI) .................................... 20225360

(51) Int. Cl.
  *H04B 1/40*  (2015.01)
  *H04B 7/06*  (2006.01)
  *H04B 7/08*  (2006.01)

(52) U.S. Cl.
  CPC ............. *H04B 1/40* (2013.01); *H04B 7/0686* (2013.01); *H04B 7/0868* (2013.01)

(58) Field of Classification Search
  CPC ....... H04B 1/40; H04B 7/0686; H04B 7/0868
  See application file for complete search history.

(56) References Cited

U.S. PATENT DOCUMENTS

| | | | |
|---|---|---|---|
| 6,570,527 B1 | 5/2003 | Lindskog et al. | |
| 10,484,038 B1 | 11/2019 | Kimball | |
| 10,931,362 B1 * | 2/2021 | Bruzzone | H04B 17/12 |
| 2004/0048584 A1 | 3/2004 | Vaidyanathan et al. | |
| 2008/0025381 A1 * | 1/2008 | Lee | H04B 1/30 375/219 |

(Continued)

FOREIGN PATENT DOCUMENTS

| | | |
|---|---|---|
| WO | 2010/087749 A1 | 8/2010 |
| WO | 2020/244783 A1 | 12/2020 |

OTHER PUBLICATIONS

Office Action and Search Report dated Aug. 19, 2022 corresponding to Finnish Patent Application No. 20225360.

(Continued)

*Primary Examiner* — Jean B Corrielus
(74) *Attorney, Agent, or Firm* — SQUIRE PATTON BOGGS (US) LLP (57) ABSTRACT

A method comprises capturing a first signal from a first radio chain, and dividing samples of the first signal into a first set of sub-vectors. A second signal is captured from a second radio chain. Samples of the second signal are divided into a second set of sub-vectors according to the determined mapping pattern. A gain difference and phase difference between each sub-vector of the first set and a sub-vector of the second set are estimated, acquiring gain differences and phase differences of the first signal and the second signal. The sub-vector level gain differences are combined to acquire a gain difference between the first signal and the second signal. The sub-vector-level phase differences are combined to acquire a phase difference between the first signal and the second signal. One of the first radio chain and the second radio chain are configured to reduce the gain difference and phase difference.

12 Claims, 5 Drawing Sheets

(56) References Cited

U.S. PATENT DOCUMENTS

| | | | |
|---|---|---|---|
| 2010/0067622 A1* | 3/2010 | Komaili | H03D 3/009 |
| | | | 375/345 |
| 2012/0270511 A1* | 10/2012 | Dakshinamurthy | |
| | | | H03G 3/3042 |
| | | | 455/115.1 |
| 2014/0004801 A1* | 1/2014 | Cohen | H04B 17/12 |
| | | | 455/67.16 |
| 2017/0288790 A1 | 10/2017 | Haub et al. | |
| 2018/0358976 A1* | 12/2018 | Pu | H03M 1/0609 |
| 2021/0099242 A1 | 4/2021 | Bai et al. | |
| 2021/0159594 A1 | 5/2021 | Tiebout et al. | |

OTHER PUBLICATIONS

Communication of Acceptance—section 29 a of Patents Decree dated Dec. 22, 2022 corresponding to Finnish Patent Application No. 20225360.

Extended European Search Report dated Sep. 21, 2023 corresponding to European Patent Application No. 23155719.0.

* cited by examiner

Fig. 8

RF CHAIN OFFSET ESTIMATION AND REDUCTION

CROSS REFERENCE TO RELATED APPLICATION

This application claims the benefit of Finnish Patent Application No. 20225360, filed Apr. 28, 2022. The entire content of the above-referenced application is hereby incorporated by reference.

FIELD

Various embodiments described herein relate to the field of radio devices with multiple parallel radio frequency (RF) transmitter and/or receiver chains and, particularly, to estimating and correcting gain and phase offsets between the different RF chains.

BACKGROUND

Multiple-input-multiple-output (MIMO) radio devices comprise multiple RF chains, and it would be advantageous if the RF chains had the same phase and gain response, e.g. for the purpose of coherent combining of the different RF chains. Each RF chain comprises RF components such as intermediate frequency or RF filters, frequency converters, and amplifiers. The response of an RF component, such as gain and phase, usually has tolerances which is the main reason why the overall gain-phase of one RF chain might be different from other RF chain, even though they are using identical components. The difference in the responses causes degradation of performance in procedures where the signals from the RF chains or the RF chains are combined.

BRIEF DESCRIPTION

Some aspects of the invention are defined by the independent claims.

Some embodiments of the invention are defined in the dependent claims.

The embodiments and features, if any, described in this specification that do not fall under the scope of the independent claims are to be interpreted as examples useful for understanding various embodiments of the invention. Some aspects of the disclosure are defined by the independent claims.

According to an aspect, there is provided an apparatus comprising means for performing: capturing a first signal from a first radio chain; dividing samples of the first signal into a first set of sub-vectors according to a determined mapping pattern that maps the samples of the first signal to sub-vectors of the first set; capturing a second signal from a second radio chain, wherein both the first radio chain and the second radio chain are either radio receiver chains or radio transmitter chains; dividing samples of the second signal into a second set of sub-vectors according to the determined mapping pattern; estimate a gain difference and phase difference between each sub-vector of the first set and a respective sub-vector of the second set, thus acquiring sub-vector-level gain differences and sub-vector-level phase differences the first signal and the at least second signal; combining the sub-vector level gain differences to acquire a gain difference between the first signal and the second signal, and combining the sub-vector-level phase differences to acquire a phase difference between the first signal and the second signal; and configuring at least one of the first radio chain and the second radio chain to reduce the gain difference and the phase difference.

In an embodiment, the first radio chain and the second radio chain are radio receiver chains, and wherein the means are configured to capture the first signal and the second signal after an output of an analog-to-digital converter configured to perform analog-to-digital conversions of the first signal and the second signal.

In an embodiment, the combining comprises averaging the sub-vector-level gain differences and averaging the sub-vector-level phase differences to obtain the gain difference and the phase difference between the first signal and the second signal, respectively.

In an embodiment, the captured first signal has the same total number of samples as the captured second signal, wherein the samples of the first signal and the second signal are indexed, and wherein the mapping pattern maps said indices to the sub-vectors.

In an embodiment, the means are configured to estimate the gain difference and phase difference by computing a Hermitian multiplication between a first matrix comprising sub-vectors of the first set and a second matrix comprising respective sub-vectors of the second set.

In an embodiment, the means are configured to captured first signal simultaneously with the second signal.

In an embodiment, the first signal and the second signal comprise payload data or signalling information from another apparatus.

In an embodiment, the apparatus further comprises a coupling circuitry configured to couple the first radio chain to the second radio chain to form a single radio chain, and wherein the means are configured to captured the first signal and the second signal while the first radio chain is coupled to the second radio chain by the coupling circuitry.

In an embodiment, the first antenna element and the second antenna element are configured to receive the same type of polarization.

In an embodiment, the means comprise at least one processor and at least one memory including computer program code, the at least one memory and computer program code configured to, with the at least one processor, cause the performance of the apparatus.

In an embodiment, the apparatus is for a terminal device of a cellular communication system.

In an embodiment, the apparatus is for an access node of a cellular communication system.

According to an aspect, a method comprises: capturing a first signal from a first radio chain; dividing samples of the first signal into a first set of sub-vectors according to a determined mapping pattern that maps the samples of the first signal to sub-vectors of the first set; capturing a second signal from a second radio chain, wherein both the first radio chain and the second radio chain are either radio receiver chains or radio transmitter chains; dividing samples of the second signal into a second set of sub-vectors according to the determined mapping pattern; estimating a gain difference and phase difference between each sub-vector of the first set and a respective sub-vector of the second set, thus acquiring sub-vector-level gain differences and sub-vector-level phase differences the first signal and the at least second signal; combining the sub-vector level gain differences to acquire a gain difference between the first signal and the second signal, and combining the sub-vector-level phase differences to acquire a phase difference between the first signal and the second signal; and configuring at least one of the first radio chain and the second radio chain to reduce the gain difference and the phase difference.

In an embodiment, the first radio chain and the second radio chain are radio receiver chains, and the first signal and the second signal are captured after an output of an analog-to-digital converter configured to perform analog-to-digital conversions of the first signal and the second signal.

In an embodiment, the combining comprises averaging the sub-vector-level gain differences and averaging the sub-vector-level phase differences to obtain the gain difference and the phase difference between the first signal and the second signal, respectively.

In an embodiment, the captured first signal has the same total number of samples as the captured second signal, wherein the samples of the first signal and the second signal are indexed, and wherein the mapping pattern maps said indices to the sub-vectors.

In an embodiment, the gain difference and phase difference are estimated by computing a Hermitian multiplication between a first matrix comprising sub-vectors of the first set and a second matrix comprising respective sub-vectors of the second set.

In an embodiment, the first signal is captured simultaneously with the second signal.

In an embodiment, the first signal and the second signal comprise payload data or signalling information from another apparatus.

In an embodiment, the method further comprises coupling, by a coupling circuitry, the first radio chain to the second radio chain to form a single radio chain, and wherein the first signal and the second signal are captured while the first radio chain is coupled to the second radio chain by the coupling circuitry.

In an embodiment, the first antenna element and the second antenna element are configured to receive the same type of polarization.

In an embodiment, the method is performed by a terminal device of a cellular communication system.

In an embodiment, the method is performed by an access node of a cellular communication system.

According to an aspect, there is provided a computer program product embodied on a computer-readable medium and comprising a computer program code readable by a computer, wherein the computer program code configures the computer to carry out a computer process comprising: capturing a first signal from a first radio chain; dividing samples of the first signal into a first set of sub-vectors according to a determined mapping pattern that maps the samples of the first signal to sub-vectors of the first set; capturing a second signal from a second radio chain, wherein both the first radio chain and the second radio chain are either radio receiver chains or radio transmitter chains; dividing samples of the second signal into a second set of sub-vectors according to the determined mapping pattern; estimate a gain difference and phase difference between each sub-vector of the first set and a respective sub-vector of the second set, thus acquiring sub-vector-level gain differences and sub-vector-level phase differences the first signal and the at least second signal; combining the sub-vector level gain differences to acquire a gain difference between the first signal and the second signal, and combining the sub-vector-level phase differences to acquire a phase difference between the first signal and the second signal; and configuring at least one of the first radio chain and the second radio chain to reduce the gain difference and the phase difference.

LIST OF DRAWINGS

Embodiments are described below, by way of example only, with reference to the accompanying drawings, in which.

DESCRIPTION OF EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. A person skilled in the art will realize that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
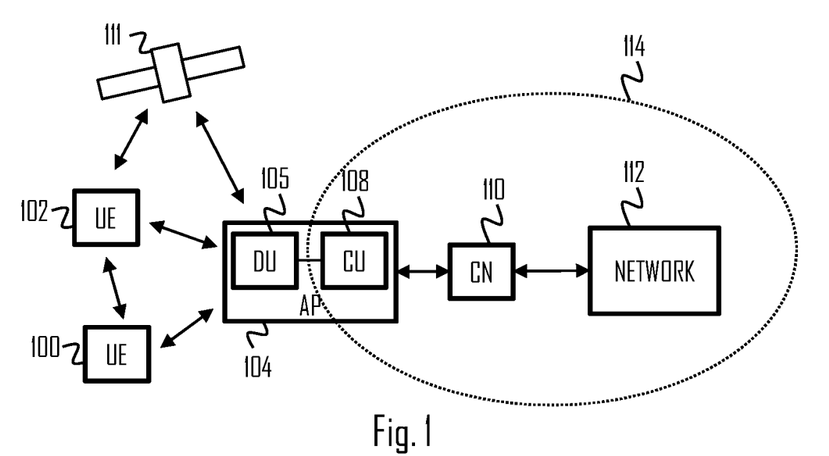
FIG. 1 illustrates a wireless communication scenario to which some embodiments of the invention may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows terminal devices or user devices 100 and 102 configured to be in a wireless connection on one or more communication channels in a cell with an access node (such as (e/g)NodeB) 104 providing the cell. (e/g)NodeB refers to an eNodeB or a gNodeB, as defined in 3GPP specifications. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used not only for signalling purposes but also for routing data from one (e/g)NodeB to another. The (e/g)NodeB is a computing device configured to control the radio resources of communication system it is coupled to. The NodeB may also be referred to as a base station, an access point, an access node, or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station. 5G specifications support at least the following relay operation modes: out-of-band relay where different carriers and/or RATs (Radio access technologies) may be defined for an access link and a backhaul link; and in-band-relay where the same carrier frequency or radio resources are used for both access and backhaul links. In-band relay may be seen as a baseline relay scenario. A relay node is called an integrated access and backhaul (IAB) node. It has also inbuilt support for multiple relay hops. IAB operation assumes a so-called split architecture having CU and a number of DUs. An IAB node contains two separate functionalities: DU (Distributed Unit) part of the IAB node facilitates the gNB (access node) functionalities in a relay cell, i.e. it serves as the access link; and a mobile termination (MT) part of the IAB node that facilitates the backhaul connection. A Donor node (DU part) communicates with the MT part of the IAB node, and it has a wired connection to the CU which again has a connection to the core network. In the multihop scenario, MT part (a child IAB node) communicates with a DU part of the parent IAB node.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below or at 6 GHz, cmWave and mmWave, and also being capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below or at 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and typically fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network or the Internet, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 105) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 111 in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H (e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
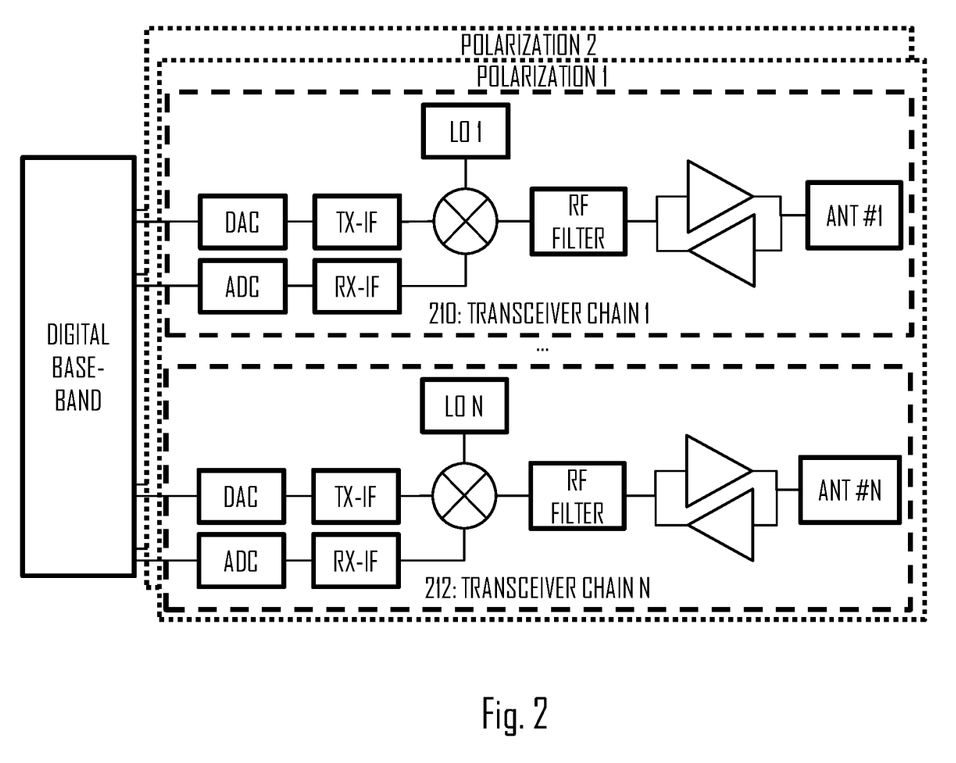
FIG. 2 illustrates transceiver chains.

FIG. 2 illustrates an example of a radio transceiver comprising multiple transmitter chains and multiple receiver chains to which embodiments described below may be applied. Illustrated components of the radio transceiver are as such known to the skilled person so detailed description of them is omitted for the sake of conciseness. The radio transceiver of FIG. 2 may be designed for multiple-input-multiple-output (MIMO) communications and may thus comprise multiple antenna elements and a transmitter and/or receiver chain per antenna element. Utilization of different antenna polarizations is commonly employed in the MIMO communications, and this is also illustrated in FIG. 2 via multiple transceiver 'layers', one per polarization. Multiple transceiver chains may be configured per polarization.

As illustrated in FIG. 2, a transmitter chain may comprise a digital-to-analog converter (DAC), an intermediate frequency transmission signal processing circuitry (TX-IF) configured to perform analog spatial signal processing for MIMO communications, a frequency-mixer configured to mix a signal being transmitted with an oscillator signal provided by a local oscillator so as to perform up-conversion to a radio frequency (RF), an RF filter to filter the up-converted signal, and a power-amplifier (illustrated by a triangle pointing towards an antenna element) to power-amplify the signal before the signal is transmitted via an antenna element. A receiver chain may comprise a low-noise amplifier (illustrated by a triangle pointing towards an antenna element), the RF filter, the frequency mixer now configured to perform down-conversion to an intermediate frequency (IF) or to a baseband, an intermediate frequency reception signal processing circuitry (RX-IF) configured to perform analog spatial signal processing for MIMO communications, and an analog-to-digital-converter (ADC) configured to digitize the signal that has travelled through the RF receiver chain. The radio transceiver may comprise multiple transceiver (transmitter+receiver) chains 210, 212 per polarization. Each transmitter chain and receiver chain may further comprise digital baseband signal processing including (de)modulation, (de)coding and various other signal processing functions. The radio transceiver may comprise a total number of N different transmitter chains and N different receiver chains. In case the radio transceiver employs two different polarizations, the total number of different transmitter/receiver chains per polarization may be N/2. Accordingly, the radio transceiver may have N transmitter chains and N receiver chains (NTNR). N may be 2, 4, 8, 16, 32, 64, or even greater, depending on the physical dimensions of the radio transceiver. For example, a terminal device may be capable of accommodating a smaller number of antenna elements than a base station.

The radio transceiver may further comprise a coupling circuit configured to couple two or more transmitter/receiver chains together on the same polarization level. The number of transmitter/receiver chains coupled together may be a function of an operating mode of the radio transceiver. For example, a 8T8R (four transceivers per polarization) radio transceiver may support a first mode with no coupling, a second mode where the transmitter/receiver chains are coupled pair-wise into a 4T4R radio transceiver (chains 1 and 2 are coupled together as well as chains 3 and 4, 5 and 6, and 7 and 8), and a third mode where all chains per polarization are coupled together into a 2T2R transceiver (single transmitter and receiver chain per polarization). This coupling may be understood as coherent combining of transmitter/receiver chains. The coherent combining may be used for the purpose of configuring a 8T8R to become a 4T4R receiver or a 2T2R receiver, for example (same for the transmitter). The use of coherent combining improves receiver sensitivity and the performance of the beamforming, for example.

Figure 3:
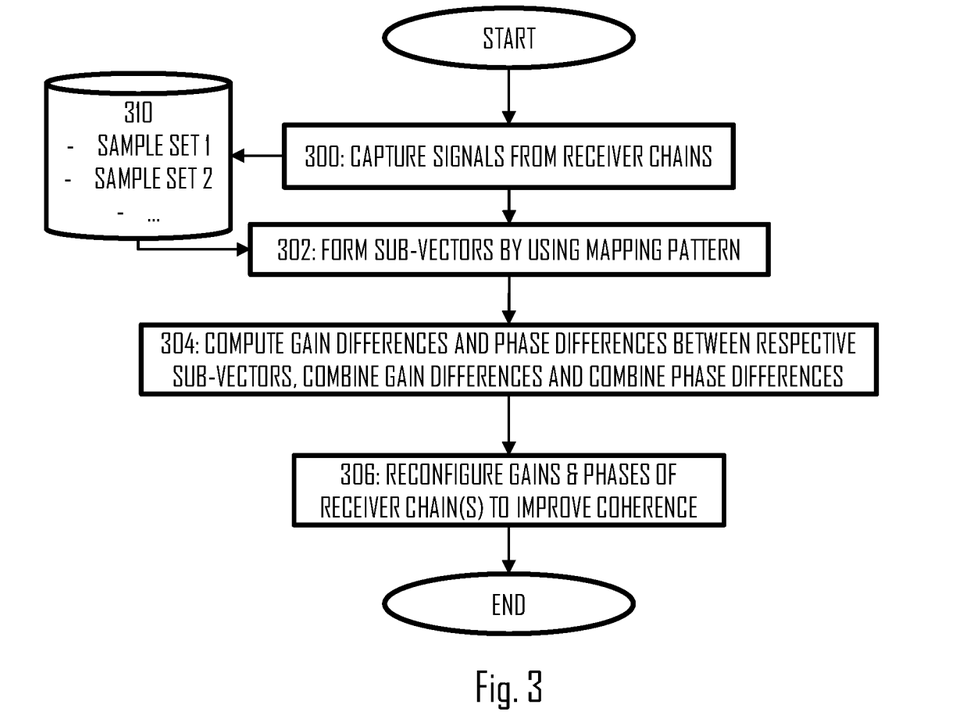
FIG. 3 illustrates a process for reducing gain/phase differences between radio receiver chains according to an embodiment.

As described in Background, the different chains may introduce different gain and phase shifts to a transmitted/received signals. Therefore, performance of the coherent combining may degrade, and other adverse effects may emerge. FIG. 3 illustrates a flow diagram of a process for estimating and reducing the problem. The process may be carried out as a computer-implemented process by a microcontroller or another processing circuitry comprising at least one processor and at least one memory storing computer program instructions for carrying out the process by the at least one processor. Referring to FIG. 3, the process comprises: capturing (block 300) a first signal from a first radio receiver chain and capturing a second signal from a second radio receiver chain; dividing (block 302) samples of the first signal into a first set of sub-vectors according to a determined mapping pattern that maps the samples of the first signal to sub-vectors of the first set; dividing (block 302) samples of the second signal into a second set of sub-vectors according to the determined mapping pattern; estimate (block 304) a gain difference and phase difference between each sub-vector of the first set and a respective sub-vector of the second set, thus acquiring sub-vector-level gain differences and sub-vector-level phase differences the first signal and the at least second signal; combining (block 304) the sub-vector level gain differences to acquire a gain difference between the first signal and the second signal, and combining the sub-vector-level phase differences to acquire a phase difference between the first signal and the second signal; and configuring (block 306) at least one of the first radio receiver chain and the second receiver radio chain to reduce the gain difference and the phase difference.

An advantage provided by the process of FIG. 3 is reduced gain and phase differences between the radio receiver chains. This improves the performance of coherent combining received via different chains, e.g. in beamforming for MIMO communications. Positive effects resulting from the improved coherence between the receiver chains include improved throughput or improved positioning accuracy, depending on the purpose for which the combining is performed. A further advantage is that no additional hardware or signaling overhead is required. Another advantage is that it allows for tracking gain-phase offset changes over temperature and time, a feature which was not available before.

Figure 4:
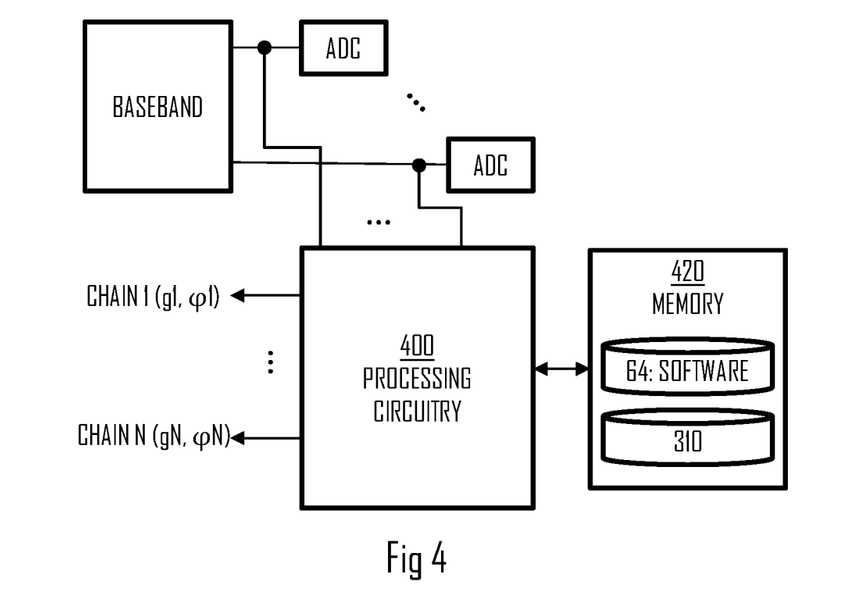
FIG. 4 illustrates an apparatus for reducing gain/phase differences between radio receiver chains according to an embodiment.

FIG. 4 illustrates an apparatus according comprising a processing circuitry 400, such as at least one processor, and at least one memory 420 including a computer program code (software) 64, wherein the at least one memory and the computer program code (software) are configured, with the at least one processor, to cause the apparatus to carry out the process of FIG. 3 or any one of its embodiments described above. The apparatus may be for the terminal device 100 or for the access node, e.g. for the DU 105. The apparatus may be a circuitry or an electronic device realizing some embodiments of the invention in the terminal device or the access node. The apparatus carrying out the above-described functionalities may thus be comprised in such a device, e.g. the apparatus may comprise a circuitry such as a chip, a chipset, a processor, a micro controller, or a combination of such circuitries for the terminal device or the access node. In other embodiments, the apparatus is generally for a radio device, e.g. the radio device or a circuitry in or designed to operate in the radio device.

The memory 420 may be implemented using any suitable data storage technology, such as semiconductor-based memory devices, flash memory, magnetic memory devices and systems, optical memory devices and systems, fixed memory and removable memory. The memory 420 may comprise the memory record 310.

In an embodiment, the apparatus further comprises the radio transceiver of FIG. 2 or a corresponding radio transceiver with multiple antenna elements and multiple parallel transmitter chains and receiver chains. The radio transceiver may further comprise a coupling circuitry configured to couple the transmitter chains together or the receiver chains together. The apparatus may further comprise a baseband signal processing circuitry configured to perform baseband signal processing functions for data transmitted through the transmitter chains and for data received through receiver chains, e.g. baseband functions described above.

In an embodiment, the first signal and the second signal are acquired in block 300 from or after an output of the analog-to-digital converters configured to perform the analog-to-digital conversions on the received first and second signal. As illustrated in FIG. 4, the first and second (and one or more further signals of one or more respective further receiver chains, if any) are acquired between the ADCs and an of the digital processing circuitry. This provides the benefit that the digital signal processing function will not introduce additional gain and/or phase shift(s) on the signals and yet the whole analog receiver chain will be covered. Upon computing the gain and phase differences in block 304, the processing circuitry 400 may compute corresponding gain and phase adjustment parameters $g_n$ and $\varphi_n$ for the receiver chains (n runs from 1 to N). The processing circuitry may use one of the receiver chains as a reference chain to which the gain(s) and phase(s) of the other receiver chains are adjusted via the gain and phase adjustment parameters. The gain and phase adjustment parameters $g_n$ and $\varphi_n$ may then be output to the respective receiver chains, e.g. to the digital TX-RX processing blocks in signal processing section.

In an embodiment, the first signal and the second signal are subjected to channel correction (equalization) before the estimation of the gain and phase offsets (differences). In such a case, the first signal and the second signal may be acquired from an output of an equalizer in the baseband processing circuitry. This provides the advantage that inter-symbol interference and other adverse effects introduced to the signals in the radio channel can be reduced.

Figure 5:
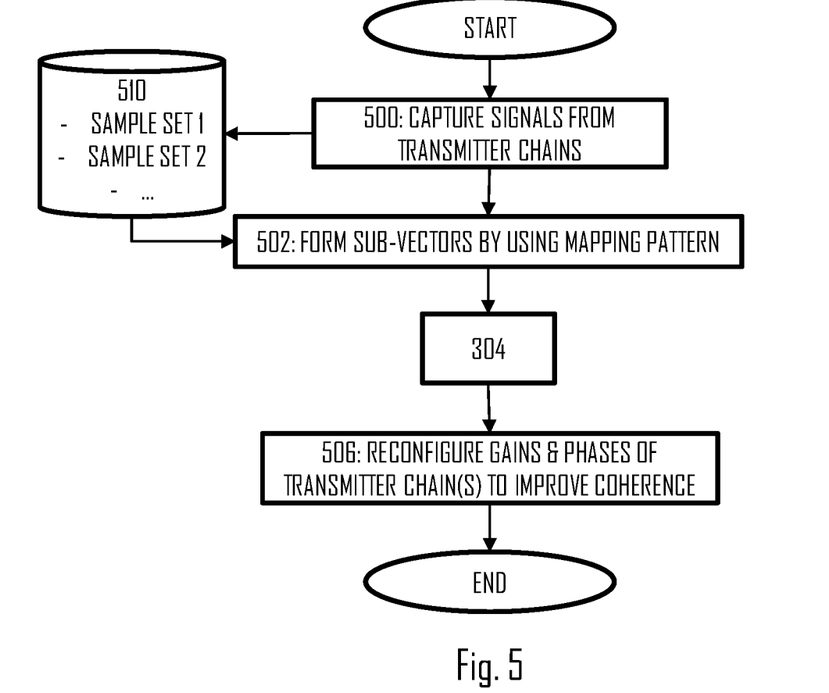
FIG. 5 illustrates a process for reducing gain/phase differences between radio transmitter chains according to an embodiment.

FIG. 3 illustrates a procedure for a radio receiver chain while FIG. 5 illustrates a procedure for a radio transmitter chain. The difference is the point from where the first and second (and optionally further) signals are captured. Referring to FIG. 5, the process for reducing gain and phase differences of transmitter chains comprises: capturing (block 500) a first signal from a first radio transmitter chain and capturing a second signal from a second radio transmitter chain; dividing (block 502) samples of the first signal into a first set of sub-vectors according to a determined mapping pattern that maps the samples of the first signal to sub-vectors of the first set; dividing (block 502) samples of the second signal into a second set of sub-vectors according to the determined mapping pattern; estimate (block 304) a gain difference and phase difference between each sub-vector of the first set and a respective sub-vector of the second set, thus acquiring sub-vector-level gain differences and sub-vector-level phase differences the first signal and the at least second signal; combining (block 304) the sub-vector level gain differences to acquire a gain difference between the first signal and the second signal, and combining the sub-vector-level phase differences to acquire a phase difference between the first signal and the second signal; and configuring (block 506) at least one of the first radio transmitter chain and the second radio transmitter chain to reduce the gain difference and the phase difference.

Effects provided by the process of FIG. 5 are similar to those of the process of FIG. 3, i.e. reduced gain and phase differences between the transmitter chains. This improves the performance of the coherent combining of the different transmitter chains, and results in improved beamforming for MIMO communications. Positive effects resulting from the improved coherence between the transmitter chains include improved throughput or improved directivity of radio beams. After the (re)configuring in block 306 or 506, the reconfigured receiver chain may be used in reception of radio signals and the reconfigured transmitter chain may be used in transmission of radio signals with improved performance. The radio signals may carry payload data and/or signaling information.

As described above, the reduction of the gain and phase differences between the RF radio chains are applicable to both the radio receiver chains and radio transmitter chains. However, the signals subjected to the IF gain/phase offset estimation may all be either from the radio receiver chains or from the radio transmitter chains. The gain/phase offset from a receiver chain may be different from that of transmitter chains, because the IF circuitry of a receiver chain is different from the IF circuitry of a transmitter chain, while the RF sections are usually common.

Figure 6:
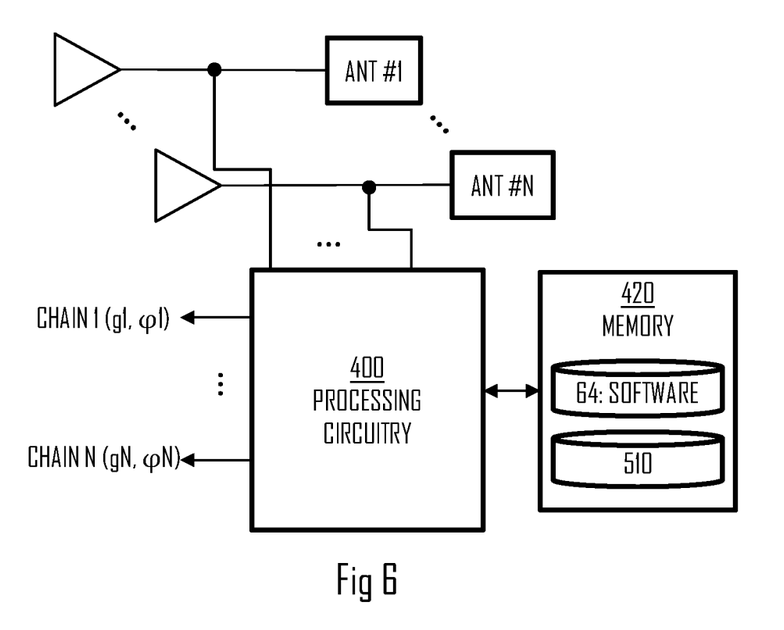
FIG. 6 illustrates an apparatus for reducing gain/phase differences between radio transmitter chains according to an embodiment.

FIG. 6 illustrates the apparatus of FIG. 4 with the modification that the inputs from the transceiver chains to the processing circuitry are now from the outputs of the power amplifiers and that the processing circuitry 400 may further comprise an ADC circuitry to digitize the power-amplified signals, or a separate ADC circuitry may be provided before the processing circuitry. Some transmitter chains utilize a digital predistortion circuitry configured to measure distortion induced by the power-amplifier and to pre-distort the transmission signal before the power-amplifier in order to compensate for the power-amplifier distortion. Such a circuitry may be employed in these embodiments for capturing the first and second signals from the output of the respective power-amplifiers. Blocks 302 and 304 may be similar or identical in the processes of FIGS. 3 and 5.

Upon computing the gain and phase differences in block 304, the processing circuitry 400 may compute corresponding gain and phase adjustment parameters $g_n$ and $\varphi_n$ for the transmitter chains (n runs from 1 to N). The processing circuitry may use one of the transmitter chains as a reference chain to which the gain(s) and phase(s) of the other transmitter chains are adjusted via the gain and phase adjustment parameters. The gain and phase adjustment parameters $g_n$ and $\varphi_n$ may then be output to the respective transmitter chains, e.g. to the transmission signal processing blocks of the transmitter chains.

As illustrated above, the processes of FIGS. 3 and 5 are similar after the acquisition of the signals from the transmitter/receiver chains and the sub-vectorization. The gain/phase difference (offset) estimation and correction parameter computation may thus use the same principles for the transmitter and receiver chains while the results and the adjustment parameters may slightly differ due to the small differences between the transmitter and receiver IF circuitries. Even the mapping pattern may be identical for the transmitter and receiver chains. Therefore, the embodiments described below are applicable to both processes.

In case the apparatus supporting the processes of FIGS. 3 and 5 is the access node, the process of FIG. 3 may be used for uplink signals while the process of FIG. 5 may be used for downlink signals.

In an embodiment, the first signal is acquired simultaneously with the second signal. In the process of FIG. 3, the signals have thus experienced MIMO fading channel conditions in a radio channel. Moreover, if the signals have a cyclo-stationarity property due to their frame and/or sub-frame structure, the embodiments described herein further improve performance against the MIMO fading, and improve accuracy of the gain and phase difference computation.

In an embodiment, the first signal and the second signal comprise payload data or signaling information to/from another apparatus. In other words, the process according to this embodiment operates 'blindly' and requires no separate pilot or reference signal transmissions, thus providing efficient operation and reduced signaling overhead.

In an embodiment, the apparatus comprises a coupling circuitry configured to couple the first receiver chain to the second receiver chain to form a single receiver chain, and the first signal and the second signal are captured while the first receiver chain is coupled to the second receiver chain by the coupling circuitry. In this manner, since the combined chains are using the same signal, the offset estimation between radio chain is possible. The coupling may be performed in the transmitter chain after the RF filter and before the power amplifier, and in the receiver chain after the low-noise amplifier and before the RF filter.

In an embodiment, the first antenna element and the second antenna element are configured to receive the same type of polarization. Accordingly, the process of FIG. 3 or 5 may be performed within the same polarization type.

The signals from the transmitter/receiver chains are digitized and, thus, each signal can be understood as a sequence of samples. The number of samples per signal may be in 1000 to 10 000 samples, tens of thousands of samples, or even one hundred thousand or more samples. Each signal may thus form a sample vector: the first signal is a first sample vector and the second signal is a second sample vector. As described above, block 304 is performed on a sub-vector level. It means that the first sample vector is divided into the first set of sub-vectors according to the determined mapping pattern that maps the samples of the first sample vector to sub-vectors of the first set, and the second sample vector is divided into the second set of sub-vectors according to the (same) determined mapping pattern. Similar procedure may be performed for further signals (sample vectors) representing the other transmitter/receiver chains. Then, the gain and phase offset estimation are performed between each sub-vector of the first set and a respective sub-vector of the second set, thus acquiring sub-vector-level gain differences and phase differences. A final estimate between the gain differences and the phase differences between the transmitter/receiver chains is obtained by combining the sub-vector-level 'cross-chain' estimates of the gain differences and the sub-vector-level estimates of the phase differences. This in turn improves the accuracy of overall cross-chain estimation, and also reduces computational complexity because the estimation on a level of a large sample set is split into smaller mathematical operations that are computationally less complex.

Figure 7:
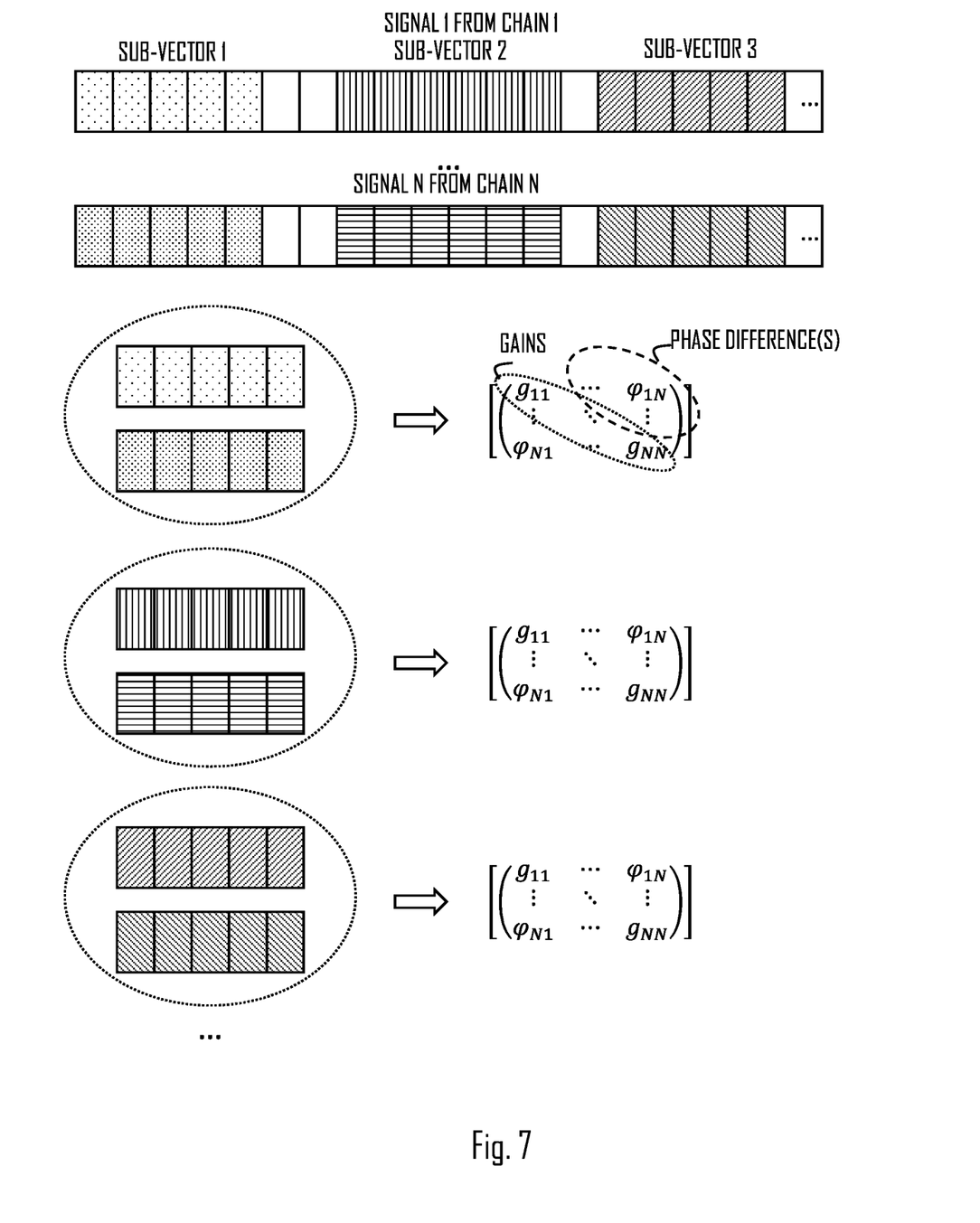
FIG. 7 illustrates sub-vector-level gain/phase difference estimation according to an embodiment.

FIG. 7 illustrates the sub-vectorization and associated embodiment for blocks 302 and 304. In FIG. 7, the sample vectors (signal 1, . . . , signal N) are illustrated as a sequence of samples (each sample represented by a small rectangle). The sub-vectors are illustrated by a sequence of samples having the same pattern (dotted or lined). An arbitrary number of sub-vectors may be taken from each sample vector, and the samples of the sub-vectors from a sample vector may be exclusive such that no sample of a sample vector is in multiple sub-vectors, or some samples may be in multiple sub-vectors but so that there are no two identical sub-vectors from a sample vector. The sample vectors may be indexed, and the above-described mapping pattern may define which indices belong to which sub-vectors. Since the same mapping pattern is used for the different sample vectors, samples from the same indices will be selected from the different sample vectors to the sub-vectors subjected to the cross-chain gain and phase offset estimation. Let us describe this via examples referring to FIG. 7

The mapping pattern used in the embodiment of FIG. 7 defines that samples $y_1$ to $y_6$ from indices 1 to 6 are mapped to the first sub-vector of each sample vector. Accordingly, the following sub-vectors $y_1$ $y_2$ are acquired $$\begin{bmatrix} y_1 \\ y_2 \end{bmatrix} = \begin{bmatrix} y_{11} & \cdots & y_{16} \\ y_{21} & \cdots & y_{26} \end{bmatrix}$$

The following cross-chain operation between the sub-vectors $y_1$ $y_2$ may be computed:

$$COV = \begin{bmatrix} y_1 \\ y_2 \end{bmatrix} \begin{bmatrix} y_1 \\ y_2 \end{bmatrix}^H = \begin{bmatrix} g_{11} & \varphi_{12} \\ \varphi_{21} & \varphi_{22} \end{bmatrix}$$

where H represents a Hermitian (conjugate transpose) operation. The cross-chain operation matrix resulting from this matrix multiplication operation will have a number of rows and a number of columns equal to the number of radio chains, e.g. 2-by-2 matrix in this case. Now, the diagonal elements $g_{11}$, $g_{22}$ of the cross-chain matrix COV represent gains introduced by the chains to the respective first radio chain's signal, actually magnitude-squared gains, while the other elements represent the phase differences between the chains ($\varphi_{12}$ representing the phase difference between chain 1 and chain 2). The same principle applies to the greater number of evaluated chains, as illustrated in FIG. 7. In this manner, it is straightforward to compute the gain difference $g_{12}$ between chain 1 and chain 2 by subtracting logarithm of values of $g_{11}$, $g_{22}$, and the phase difference $\Theta_{12}$ between chain 1 and chain 2 may be computed by computing $\arg(\varphi_{12})$ The same procedure is applied to each sub-vector pair, as illustrated in FIG. 7. Accordingly, a set of gain difference values $g_{12}$ and a set of phase difference values $\Theta_{12}$ is obtained. The number of sets of gain difference values $g_{12}$ and a set of phase difference values $\Theta_{12}$ depend on the number of radio chains included in the process, and is N. Now, the final estimate of the gain difference is achieved by averaging over the set of gain difference values $g_{12}$ while the final estimate of the phase difference is achieved by averaging over the set of phase difference values $\Theta_{12}$. As a result, L–Q+1 final gain difference values and L–Q+1 final phase difference values are acquired, where L is the total number of captured samples per receiver chain, Q is the sub-vector size, representing the gain and phase differences of chains with respect to a reference chain, and the respective gain and phase adjustment parameters can be computed in a straightforward manner.

As described above, the first sample vector may have the same total number of samples as the second sample vector, wherein the samples of the first signal and the second signal are indexed, and wherein the mapping pattern maps said indices to the sub-vectors.

Figure 8:
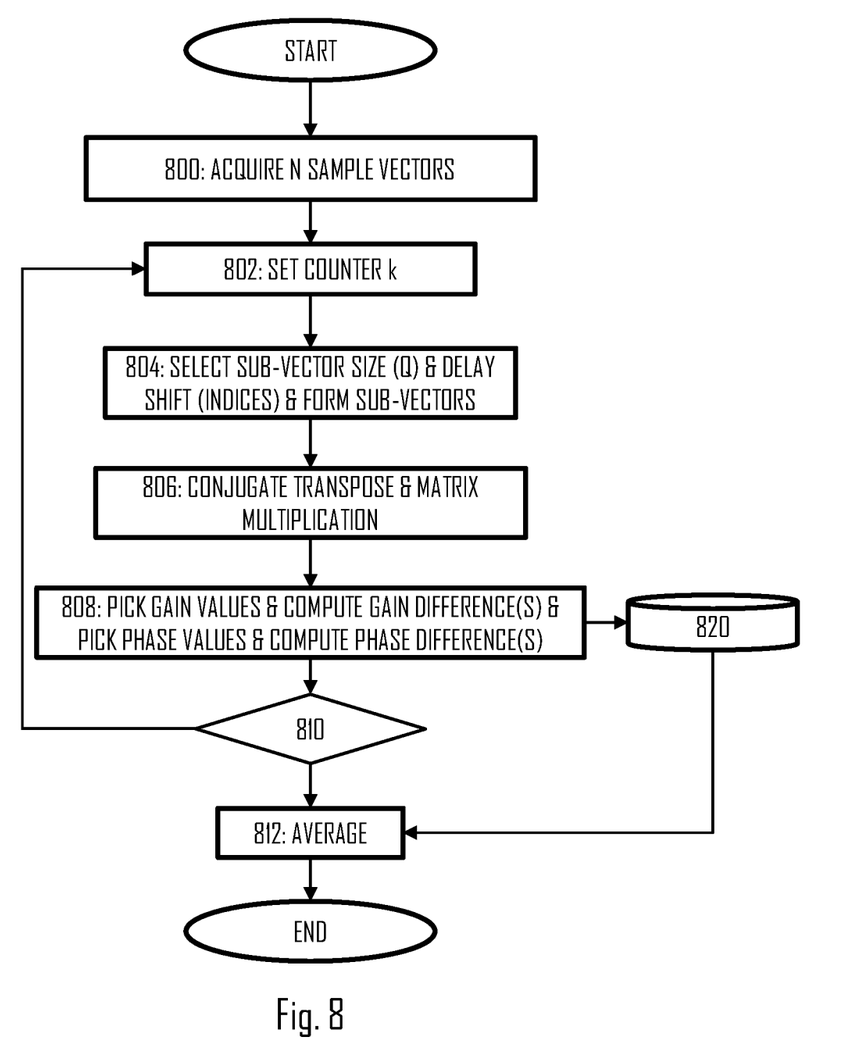
FIG. 8 illustrates a flow diagram of a process according to an embodiment.

FIG. 8 illustrates an embodiment of the above-described sub-vector-level process in a greater detail. Referring to FIG. 8, the N sample vectors are acquired in block 800 from different transmitter or receiver chains. The number of sub-vectors per sample vector is denoted by K. In block 802, a counter k is initialized. In block 804, a sub-vector size (length) Q is set and a delay shift is determined from the mapping pattern. The mapping pattern may provide for probabilistic pattern where the delay shift is randomized (uniform distribution). Then, the sub-vectors are formed such that Q samples are selected starting from an index of the sample set defined by the (randomized) delay shift. The same Q and delay shift may be applied to all sample vectors in block 804. Then, the conjugate transpose and the vector/matrix multiplication described above are performed in block 806 to acquire the gain values $g_{11}$ to $g_{NN}$ and phase offset values $\varphi_{11}$ to $\varphi_{1N}$. The gain difference values and phase difference values may be computed, as described above, and stored in a database 820. Thereafter, it is determined in block 810 whether or not to take another sub-vector from the sample vectors. A number of sub-vectors may be predefined on the basis of, for example, K or it may be a fixed value defining how many sub-vectors are required for acceptable accuracy. If another sub-vector shall be taken from the sample vectors, the process returns to block 802 where k is incremented. If a sufficient number of sub-vectors has been processed, the process may proceed to block 812 where the gain difference values are acquired from the database 820 and averaged. Similarly, the phase difference values are acquired from the database 820 and averaged. Thereafter, the process may proceed to the computation of the gain adjustment parameters and phase adjustment parameters for the chains.

It should be understood that the sub-vector-level estimation of the gain and phase differences applies to both processes of FIGS. 3 and 5. As a consequence, the process for estimating the gain and phase differences of the transmitter/receiver chains may be generalized to comprise: acquiring a first signal from a first radio chain; acquiring a second signal from a second radio chain; dividing samples of the first signal into a first set of sub-vectors according to a determined mapping pattern that maps the samples of the first signal to sub-vectors of the first set; dividing samples of the second signal into a second set of sub-vectors according to the determined mapping pattern; performing the cross-chain gain/phase offset estimation between each sub-vector of the first set and a respective sub-vector of the second set, thus acquiring sub-vector-level gain differences and phase differences; computing a gain difference and a phase difference between the first signal and the second signal on the basis of the cross-chain gain/phase offset estimation; and configuring at least one of the first radio chain and the second radio chain to reduce the computed gain difference and the phase difference.

As used in this application, the term 'circuitry' refers to one or more of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention. The processes or methods described in FIG. 3 or any of the embodiments thereof may also be carried out in the form of one or more computer processes defined by one or more computer programs. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

Embodiments described herein are applicable to wireless networks defined above but also to other wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:

1. An apparatus, comprising:
at least one processor; and
and at least one memory including computer program code, the at least one memory and computer program code configured to, with the at least one processor, cause the apparatus to perform:
capturing a first signal from a first radio chain;
dividing samples of the first signal into a first set of sub-vectors according to a determined mapping pattern that maps the samples of the first signal to sub-vectors of the first set;
capturing a second signal from a second radio chain, wherein both the first radio chain and the second radio chain are either radio receiver chains or radio transmitter chains;
dividing samples of the second signal into a second set of sub-vectors according to the determined mapping pattern;
estimate a gain difference and phase difference between each sub-vector of the first set and a respective sub-vector of the second set, thus acquiring sub-vector-level gain differences and sub-vector-level phase differences between the first signal and the at least second signal;
combining the sub-vector level gain differences to acquire a gain difference between the first signal and the second signal, and combining the sub-vector-level phase differences to acquire a phase difference between the first signal and the second signal; and
configuring at least one of the first radio chain and the second radio chain to reduce the gain difference and the phase difference;
coupling the first radio chain to the second radio chain to form a single radio chain; and
acquiring the first signal and the second signal while the first radio chain is coupled to the second radio chain.

2. The apparatus of claim 1, wherein the first radio chain and the second radio chain are radio receiver chains, and wherein the at least one memory and computer program code are further configured, with the at least one processor, to cause the apparatus to capture the first signal and the second signal after an output of an analog-to-digital converter configured to perform analog-to-digital conversions of the first signal and the second signal.

3. The apparatus of claim 1, wherein the combining comprises averaging the sub-vector-level gain differences and averaging the sub-vector-level phase differences to obtain the gain difference and the phase difference between the first signal and the second signal, respectively.

4. The apparatus of claim 3, wherein the captured first signal has the same total number of samples as the captured second signal, wherein the samples of the first signal and the second signal are indexed, and wherein the mapping pattern maps said indices to the sub-vectors.

5. The apparatus of claim 1, wherein the at least one memory and computer program code are further configured, with the at least one processor, to cause the apparatus to estimate the gain difference and phase difference by computing a Hermitian multiplication between a first matrix comprising sub-vectors of the first set and a second matrix comprising respective sub-vectors of the second set.

6. The apparatus of claim 1, wherein the at least one memory and computer program code are further configured, with the at least one processor, to cause the apparatus to acquire first signal simultaneously with the second signal.

7. The apparatus of claim 1, wherein the first signal and the second signal comprise payload data or signaling information from another apparatus.

8. The apparatus of claim 1, wherein a first antenna element and a second antenna element are configured to receive the same type of polarization.

9. The apparatus of claim 1, wherein the apparatus is for a terminal device of a cellular communication system.

10. The apparatus of claim 1, wherein the apparatus is for an access node of a cellular communication system.

11. A method, comprising:
capturing a first signal from a first radio chain;
dividing samples of the first signal into a first set of sub-vectors according to a determined mapping pattern that maps the samples of the first signal to sub-vectors of the first set;
capturing a second signal from a second radio chain, wherein both the first radio chain and the second radio chain are either radio receiver chains or radio transmitter chains;
dividing samples of the second signal into a second set of sub-vectors according to the determined mapping pattern;
estimate a gain difference and phase difference between each sub-vector of the first set and a respective sub-vector of the second set, thus acquiring sub-vector-level gain differences and sub-vector-level phase differences between the first signal and the at least second signal;
combining the sub-vector level gain differences to acquire a gain difference between the first signal and the second signal, and combining the sub-vector-level phase differences to acquire a phase difference between the first signal and the second signal; and
configuring at least one of the first radio chain and the second radio chain to reduce the gain difference and the phase difference, and wherein the method further comprises
coupling, by a coupling circuitry, the first radio chain to the second radio chain to form a single radio chain; and
acquiring the first signal and the second signal while the first radio chain is coupled to the second radio chain by the coupling circuitry.

12. A computer program product embodied on a non-transitory computer-readable medium and comprising computer program code readable by a computer, wherein the computer program code configures the computer to carry out a computer process comprising:
capturing a first signal from a first radio chain;
dividing samples of the first signal into a first set of sub-vectors according to a determined mapping pattern that maps the samples of the first signal to sub-vectors of the first set;
capturing a second signal from a second radio chain, wherein both the first radio chain and the second radio chain are either radio receiver chains or radio transmitter chains;
dividing samples of the second signal into a second set of sub-vectors according to the determined mapping pattern;
estimate a gain difference and phase difference between each sub-vector of the first set and a respective sub-vector of the second set, thus acquiring sub-vector-level gain differences and sub-vector-level phase differences between the first signal and the at least second signal;
combining the sub-vector level gain differences to acquire a gain difference between the first signal and the second signal, and combining the sub-vector-level phase differences to acquire a phase difference between the first signal and the second signal; and
configuring at least one of the first radio chain and the second radio chain to reduce the gain difference and the phase difference, and wherein the method further comprises
coupling, by a coupling circuitry, the first radio chain to the second radio chain to form a single radio chain; and
acquiring the first signal and the second signal while the first radio chain is coupled to the second radio chain by the coupling circuitry.

* * * * *